(12) United States Patent
Miura et al.

(10) Patent No.: US 7,215,096 B2
(45) Date of Patent: May 8, 2007

(54) BATTERY PACK WITH CHARGE CONTROL FUNCTION

(75) Inventors: Seiji Miura, Atsugi (JP); Yukihiro Terada, Atsugi (JP); Akira Ikeuchi, Atsugi (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 1 day.

(21) Appl. No.: 10/789,490

(22) Filed: Feb. 26, 2004

(65) Prior Publication Data

US 2004/0189259 A1 Sep. 30, 2004

(30) Foreign Application Priority Data

Mar. 26, 2003 (JP) .............................. 2003-084326

(51) Int. Cl.
*H01M 10/46* (2006.01)

(52) U.S. Cl. ...................................... 320/134; 320/136

(58) Field of Classification Search ................ 320/134, 320/136, 150, 154
See application file for complete search history.

(56) References Cited

U.S. PATENT DOCUMENTS

| | | | | |
|---|---|---|---|---|
| 5,592,070 A | * | 1/1997 | Mino | 320/163 |
| 6,124,700 A | * | 9/2000 | Nagai et al. | 320/132 |
| 6,194,869 B1 | * | 2/2001 | Peterzell | 320/134 |

FOREIGN PATENT DOCUMENTS

JP    2872365 B2    1/1999

* cited by examiner

*Primary Examiner*—Edward H. Tso
(74) *Attorney, Agent, or Firm*—Frishauf, Holtz, Goodman & Chick, P.C.

(57) ABSTRACT

A battery pack with a charge control function includes a charge protection circuit and a charge control circuit. The charge control circuit turns a discharge control switch on or off to control a discharge current which flows from a secondary battery to a load and also turns a charge control switch on or off to control a charge current which flows from a charger to the secondary battery. When an abnormal voltage is input, the charge control circuit turns the charge control switch on or off to stop the charging of the secondary battery through the charger.

6 Claims, 4 Drawing Sheets

BATTERY PACK WITH CHARGE CONTROL FUNCTION

This application claims priority to prior Japanese application JP 2003-84326, the disclosure of which is incorporated herein by reference.

BACKGROUND OF THE INVENTION

The present invention relates to battery packs and, more particularly, relates to a battery pack with a charge control function, the battery pack having the charge control function and a charge protection function therein.

Rechargeable batteries (secondary batteries), particularly, lithium-ion batteries each requires a protection circuit (charge protection IC) for detecting an overdischarge mode and an overcharge mode to protect the present secondary battery from the overdischarge mode and the overcharge mode because the lithium-ion battery is weak in overdischarging and overcharging. Each protection circuit (charge protection IC) has an overdischarge preventive mechanism and an overcharge preventive mechanism. The protection circuits (charge protection ICs) include a protection circuit for further detecting an overcurrent mode in the discharge mode of the corresponding secondary battery to protect the battery from the overcurrent mode. This protection circuit (charge protection IC) includes an overdischarge preventive mechanism, an overcharge preventive mechanism, and an overcurrent preventive mechanism. A conventional secondary-battery protection circuit (charge protection IC) will now be described hereinbelow. The protection circuit includes an overdischarge preventive mechanism and an overcharge preventive mechanism.

A battery unit having the above-mentioned protection circuit (charge protection IC) is called a "battery pack". When a secondary battery enters the overdischarge mode, it is necessary to stop the discharging of the secondary battery and charge the secondary battery using a charger. The charger includes an adapter and a charge control circuit (charge control IC). In other words, the conventional battery pack includes only the protection circuit (charge protection IC) and the charger has the charge control circuit (charge control IC).

FIG. 1 shows a conventional battery module 800' including a charge protection IC 200 and a charge control IC 600. Referring to FIG. 1, the battery module 800' has a discharging positive terminal 801, a negative terminal 802, and a charging positive terminal 803. A load 400 is arranged between the discharging positive terminal 801 and the negative terminal 802. An adapter 700 serving as a commercial charger is arranged between the charging positive terminal 803 and the negative terminal 802. The negative terminal 802 is called a ground terminal (GND).

The battery module 800' includes: a secondary battery 300; the charge protection IC 200; the charge control IC 600; peripheral devices (a power transistor Tr, a diode D, and a current-detecting resistor R); a first field-effect transistor FET1 functioning as a discharge control switch; and a second field-effect transistor FET2 operating as a charge control switch.

The charge protection IC 200 is connected between the discharging positive terminal 801 and a negative electrode of the secondary battery 300. The charge control IC 600 and the peripheral devices are arranged between the charging positive terminal 803 and the positive electrode of the secondary battery 300. According to the arrangement, the charger comprising only the adapter 700 can be used.

A conventional battery pack 100' and a conventional charger 500' will now be described hereinbelow with reference to FIGS. 2 and 3. FIG. 2 is a block diagram showing the conventional battery pack and a protection circuit (charge protection IC) included therein. FIG. 3 is a block diagram showing the conventional charger and a charge control circuit (charge control IC) included therein.

The conventional battery pack 100' will now be described with reference to FIG. 2. This kind of battery pack is disclosed as a rechargeable power supply circuit in Japanese Patent No. 2872365. The conventional battery pack 100' will be described on the basis of the description of the above patent. In the patent document, the structure of control means is not schematically shown in accompanying drawings. In the following description, the structure of the control means is estimated by analogy with the specification of the patent. The structure of the control means will be described with reference to the drawings.

Referring to FIG. 2, the battery pack 100' has a positive terminal 101 and a negative terminal 102. Each of the positive and negative terminals 101 and 102 is called an external connection terminal. The load 400 or the charger 500' is arranged between the positive terminal 101 and the negative terminal 102. The charger 500' will be described later.

Referring to FIG. 2, the battery pack 100' has the secondary battery 300 including at least one lithium-ion battery (unit cell) 301. The secondary battery 300 generates a battery voltage Vcc(ba). The protection circuit (charge protection IC) 200 is connected in parallel to the secondary battery 300. The major features of the protection circuit 200 are an overdischarge protecting function and an overcharge protecting function. The protection circuit 200 includes an overdischarge control circuit 210 serving as the overdischarge protecting function and an overcharge control circuit 220 serving as the overcharge protecting function.

An overdischarge-detecting threshold voltage Vth(od) is predetermined in the overdischarge control circuit 210. The overdischarge control circuit 210 compares the battery voltage Vcc(ba) with the threshold voltage Vth(od). If the battery voltage Vcc(ba) is lower than the threshold voltage Vth(od), the overdischarge control circuit 210 determines an overdischarge mode and generates an overdischarge detection signal at a logical low level. The overdischarge control circuit 210 includes: a zener diode for generating an overdischarge-detecting reference voltage corresponding to the overdischarge-detecting threshold voltage Vth(od); an overdischarge resistive voltage-dividing circuit for dividing the battery voltage Vcc(ba), the circuit comprising a bleeder resistor in series; an overdischarge-detecting comparator for comparing an overdischarge divided-voltage, generated from the overdischarge resistive voltage-dividing circuit, with the overdischarge-detecting reference voltage; and an overdischarge hysteresis circuit arranged between an output terminal and a noninverting input terminal of the overdischarge-detecting comparator. The above components of the overdischarge control circuit 210 are not shown in FIG. 2.

When the overdischarge divided-voltage is lower than the overdischarge-detecting reference voltage, namely, the battery voltage Vcc(ba) is lower than the overdischarge-detecting threshold voltage Vth(od), the overdischarge-detecting comparator outputs an overdischarge detection signal at a logical low level. On the other hand, when the battery voltage Vcc(ba) is higher than an overdischarge return voltage (Vth(od)+Vhy(od)), the overdischarge-detecting comparator outputs an overdischarge-protection cancel signal at a logical high level. The overdischarge return voltage is obtained by adding the overdischarge-detecting threshold voltage Vth(od) to an overdischarge hysteresis voltage Vhy (od), which is defined by the overdischarge hysteresis circuit.

Similarly, an overcharge-detecting threshold voltage Vth (oc) is predetermined in the overcharge control circuit 220. The overcharge control circuit 220 compares the battery voltage Vcc(ba) with the threshold voltage Vth(oc). When the battery voltage Vcc(ba) is higher than the threshold voltage Vth(oc), the overcharge control circuit 220 determines an overcharge mode and outputs an overcharge detection signal at a logical low level. The overcharge control circuit 220 includes: a zener diode for generating an overcharge-detecting reference voltage corresponding to the overcharge-detecting threshold voltage Vth(oc); an overcharge resistive voltage-dividing circuit for dividing the battery voltage Vcc(ba), the circuit comprising a bleeder resistor in series; an overcharge-detecting comparator for comparing an overcharge divided-voltage, generated from the overcharge resistive voltage-dividing circuit, with the overcharge-detecting reference voltage; and an overcharge hysteresis circuit arranged between an output terminal and a noninverting input terminal of the overcharge-detecting comparator. The above components of the overcharge control circuit 220 are not shown in FIG. 2.

When the overcharge divided-voltage is higher than the overcharge-detecting reference voltage, namely, the battery voltage Vcc(ba) is higher than the overcharge-detecting threshold voltage Vth(oc), the overcharge-detecting comparator outputs an overcharge detection signal at a logical low level. On the other hand, when the battery voltage Vcc(ba) is lower than an overcharge return voltage (Vth (oc)–Vhy(oc)), the overcharge-detecting comparator outputs an overcharge-protection cancel signal at a logical high level. The overcharge return voltage is obtained by subtracting an overcharge hysteresis voltage Vhy(oc), defined by the overcharge hysteresis circuit, from the overcharge-detecting threshold voltage Vth(oc).

The first and second field-effect transistors FET1 and FET2 are connected in series between the negative electrode of the secondary battery 300 and the negative terminal 102. The first field-effect transistor FET1 operates as a discharge control switch. The second field-effect transistor FET2 functions as a charge control switch.

When the logical low level overdischarge detection signal is supplied from the overdischarge control circuit 210 to the gate of the first field-effect transistor FET1, the first field-effect transistor FET1 is turned off. On the other hand, when the logical high level overdischarge-protection cancel signal is supplied from the overdischarge control circuit 210 to the gate of the first field-effect transistor FET1, the first field-effect transistor FET1 is turned on. Similarly, when the logical low level overcharge detection signal is supplied from the overcharge control circuit 220 to the gate of the second field-effect transistor FET2, the second field-effect transistor FET2 is turned off. When the logical high level overcharge-protection cancel signal is supplied from the overcharge control circuit 220 to the gate of the second field-effect transistor FET2, the second field-effect transistor FET2 is turned on.

As described in the foregoing patent, the first field-effect transistor FET1 has a parasitic diode Dp1. The parasitic diode Dp1 is arranged such that the forward direction thereof corresponds to the charging direction of the secondary battery 300. The second field-effect transistor FET2 has a parasitic diode Dp2. The parasitic diode Dp2 is arranged such that the forward direction thereof corresponds to the discharging direction of the secondary battery 300. Therefore, if the first field-effect transistor FET1 is turned off, the secondary battery 300 can be charged through the parasitic diode Dp1. If the second field-effect transistor FET2 is turned off, the secondary battery 300 can be discharged through the parasitic diode Dp2.

The charger 500' will now be described hereinbelow with reference to FIG. 3. The charger 500' has a positive terminal 501 and a negative terminal 502. The positive terminal 501 and the negative terminal 502 of the charger 500' are connected to the positive terminal 101 and the negative terminal 102 of the battery pack 100', respectively.

Referring to FIG. 3, the charger 500' includes the adapter 700. The adapter 700 generates an adapter voltage Vcc(ad). The charge control circuit (charge control IC) 600 is connected in parallel to the adapter 700 through the power transistor Tr, the diode D, and the current-detecting resistor R. The major features of the charge control circuit 600 are a constant-current charging function, a constant-voltage charging function, and a primary overvoltage detecting function. The charge control circuit 600 includes: a constant-current control circuit 610 having the constant-current charging function; a constant-voltage control circuit 620 having the constant-voltage charging function; and a primary overvoltage detection circuit 630 having the primary overvoltage detecting function.

The constant-current control circuit 610 controls the power transistor Tr so as to keep the potential difference across the current-detecting resistor R at a predetermined value in order to charge the battery pack 100' at a constant current. The constant-voltage control circuit 620 detects the battery voltage Vcc(ba) of the secondary battery 300 and controls the power transistor Tr so that the battery voltage Vcc(ba) does not exceed a predetermined voltage in order to charge the battery pack 100'. The primary overvoltage detection circuit 630 detects the primary (adapter) voltage Vcc(ad). If the primary voltage Vcc(ad) is an overvoltage, the primary overvoltage detection circuit 630 turns the power transistor Tr off, thus stopping charging.

The power transistor Tr, the diode D, and the current-detecting resistor R are arranged in series in that order between the positive electrode of the adapter 700 and the positive terminal 501.

As mentioned above, the conventional battery pack 100' includes only the charge protection IC 200 and the conventional charger 500' includes the charge control IC 600. Namely, the conventional charger 500' exclusively charges the battery pack 100'. In other words, a commercial charger is not available as the charger 500'. To use a commercial charger, namely, to use the charger including only the adapter 700, the charge control IC 600 and the peripheral devices may be built in the battery pack.

For conventional battery protection, the following features are provided. A battery is prevented from igniting in the overcharge mode. The battery is prevented from deteriorating. Further, the battery is prevented from deteriorating and heating in the discharge mode. Even for a unit cell, the safety thereof has been pursued. Thus, the unit cell hardly ignites. In actuality, however, there are many requests to prevent batteries from deteriorating.

Referring to FIG. 2, the above-mentioned conventional battery module 800' requires the power transistor Tr and the second field-effect transistor FET2, which serves as a charge control switch. Namely, the battery module 800' requires the two devices in order to control the charging operation. Since the power transistor Tr is included in the charger and the second field-effect transistor FET2 is built in the battery pack, the manufacturing cost is high. Moreover, since the charger is concerned with the charge control and the battery pack is concerned with the charge protection, controlling functional mechanisms for battery protection (the charge control function and the charge protection function) is complicated.

Since the above two devices generate heat, it is hard to perform the above-mentioned control.

SUMMARY OF THE INVENTION

It is an object of the present invention to provide a secondary-battery charge control circuit capable of overcoming the above-mentioned disadvantages and exhibiting a battery protecting function with a simple arrangement at low cost.

According to the present invention, a battery pack having a charge control function includes: a charge protection circuit for turning a discharge control switch on or off to control a discharge current which flows from a secondary battery to a load and turning a charge control switch on or off to control a charge current which flows from a charger to the secondary battery; and a charge control circuit having a function of turning the charge control switch on or off to stop the charging of the secondary battery through the charger when an abnormal voltage is input.

The discharge control switch includes a discharge control field-effect transistor having a gate serving as a control terminal. The charge control switch includes a charge control field-effect transistor having a gate serving as a control terminal.

The discharge control field-effect transistor controls an overdischarge control circuit included in the charge protection circuit. The charge control field-effect transistor controls an overcharge control circuit included in the charge protection circuit and also controls the charge control circuit.

For the characteristics of the charge control field-effect transistor, a gate voltage of the charge control field-effect transistor is controlled to adjust a drain current thereof so that the one charge control field-effect transistor performs both charge control and overcharge control.

The charge protection circuit includes a temperature detection unit.

The temperature detection unit detects a temperature in discharge control through the discharge control switch and detects a temperature in the charge control through the charge control switch.

DESCRIPTION OF THE PREFERRED EMBODIMENT

Figure 1:
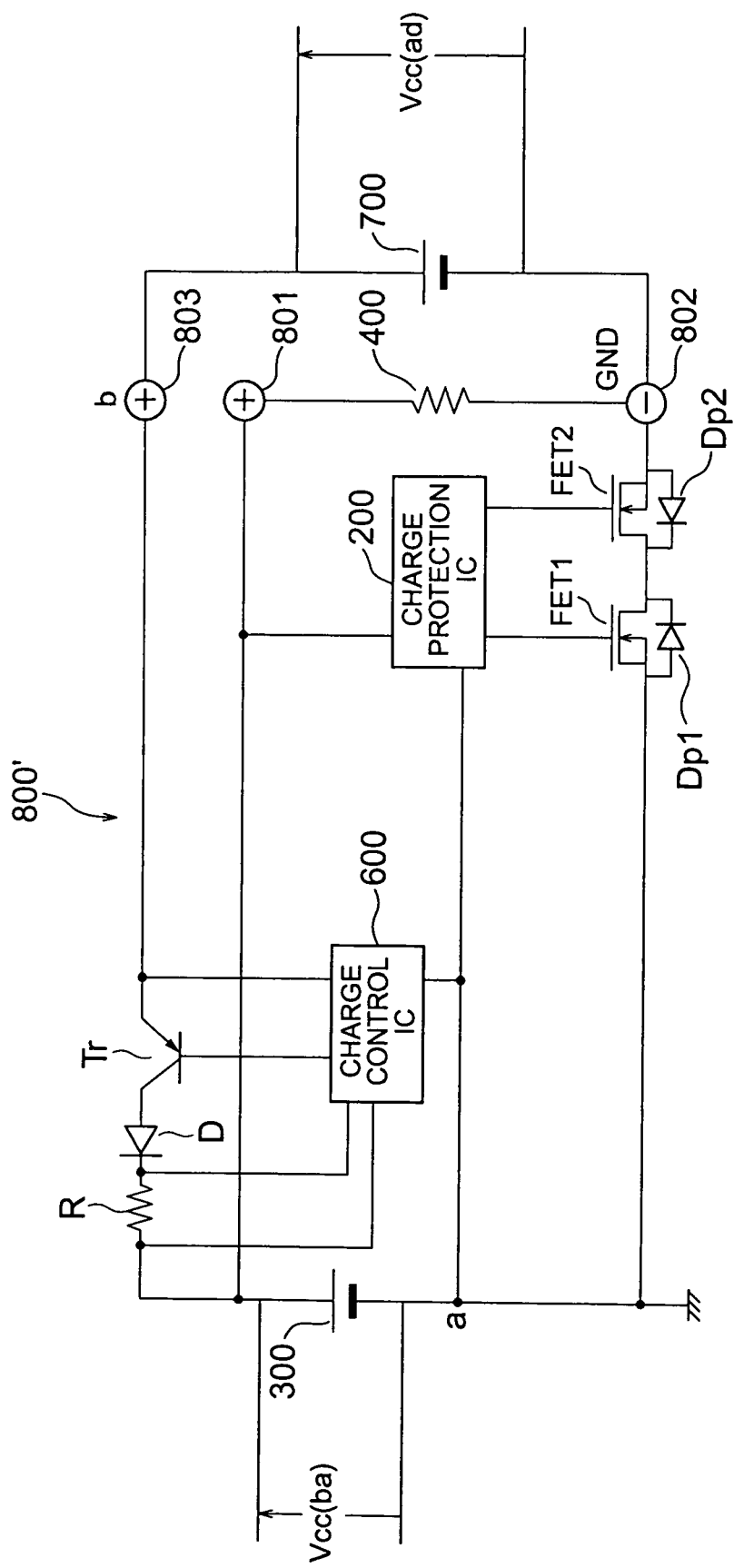
FIG. 1 is a block diagram showing the structure of a conventional battery module.
Figure 4:
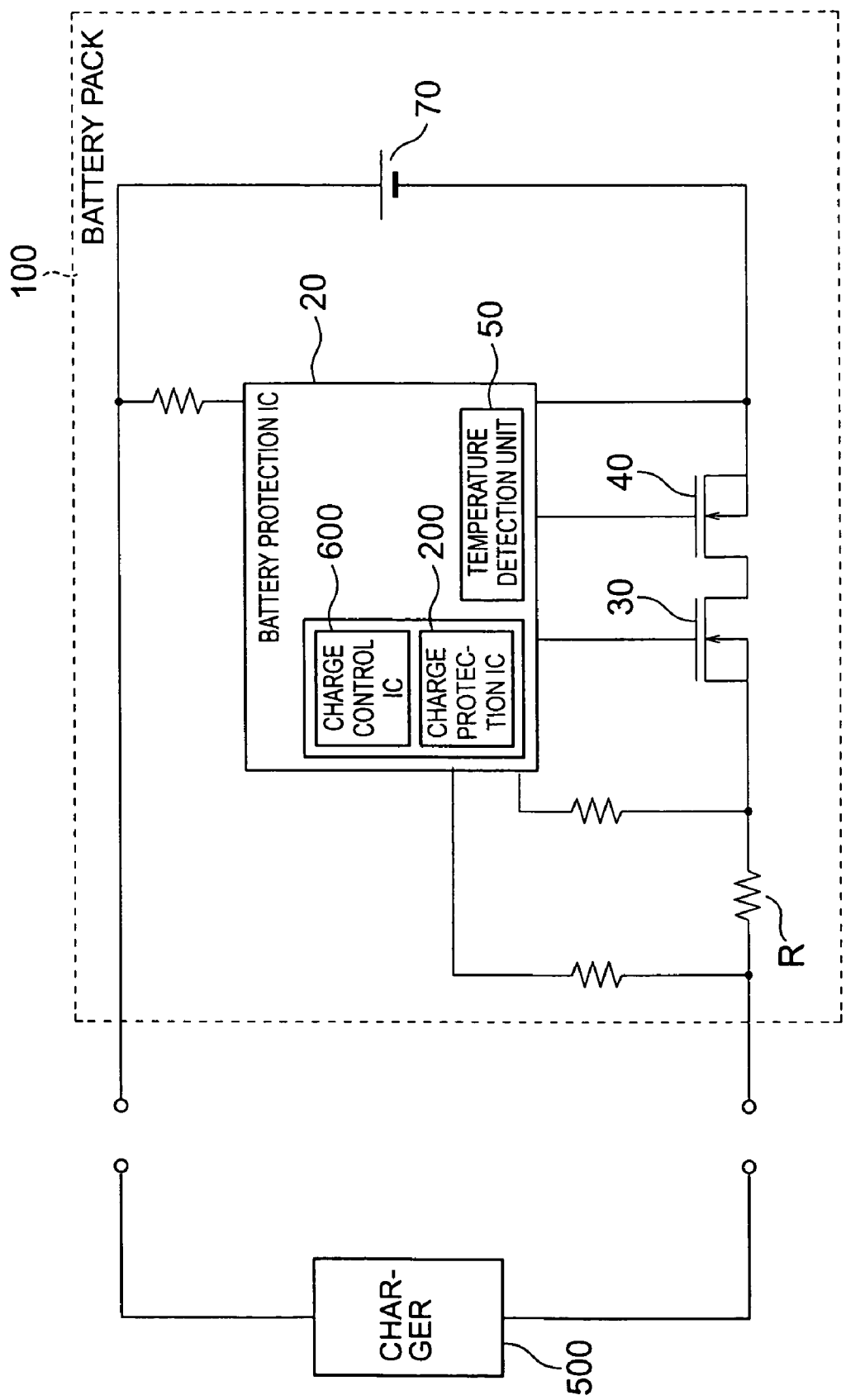
FIG. 4 is a block diagram showing the structure of a battery pack with a charge control function according to an embodiment of the present invention.

A secondary-battery charge control circuit according to an embodiment of the present invention will now be described hereinbelow with reference to FIG. 4. Referring to FIG. 4, a charge control IC 600 and a charge protection IC 200 in a battery pack 100 are the same as those in FIG. 1. In FIG. 4, therefore, components having the same functions as those in the components in FIG. 1 are designated by the same reference numerals. The explanation of the respective components is omitted to simplify the description. In the foregoing related art, the parasitic diode Dp1 is connected to the first field-effect transistor FET1 such that the forward direction of the parasitic diode Dp1 corresponds to the charging direction of the secondary battery and the parasitic diode Dp2 is connected to the second field-effect transistor FET2 such that the forward direction of the parasitic diode Dp2 corresponds to the discharging direction of the secondary battery. According to the present embodiment, the respective parasitic diodes are similarly arranged but they are not shown in FIG. 4.

Referring to FIG. 4, the battery pack 100 has: a battery protection IC 20 including the charge control IC 600, the charge protection IC 200, and a temperature detection unit 50; a secondary battery (lithium-ion cell) 70; a charge control transistor (FET) 30; and a discharge control transistor (FET) 40. The charge control FET 30 and the discharge control FET 40 are connected in series between a negative electrode of the secondary battery 70 and a negative terminal of the charger 500.

Figure 2:
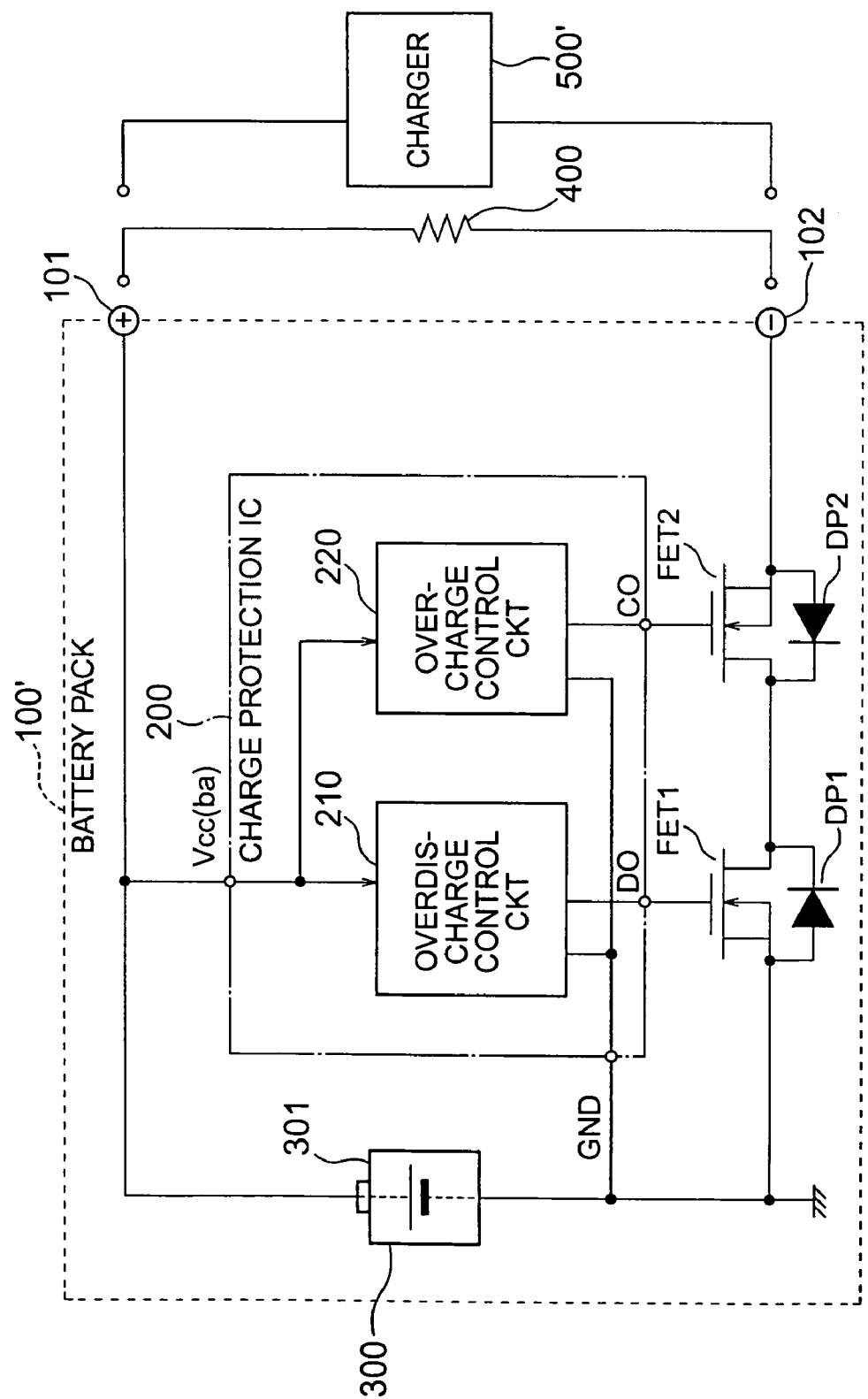
FIG. 2 is a block diagram showing the arrangement of a conventional battery pack and a protection circuit (charge protection IC) provided therefor.

The major features of the charge protection IC 200 are an overdischarge protecting function and an overcharge protecting function. The charge protection IC 200 includes an overdischarge control circuit 210 having the overdischarge protecting function and an overcharge control circuit 220 having the overcharge protecting function. The structure of the charge protection IC 200 is the same as that shown in FIG. 2. The respective functions of the charge protection IC 200 have been described in detail in the explanation regarding the foregoing related art. In the present embodiment, therefore, the detailed description of the circuit 200 is omitted.

The charge control IC 600 has a constant-current control circuit 610 having a constant-current charging function, a constant-voltage control circuit 620 having a constant-voltage charging function, and a primary overvoltage detection circuit 630 having a primary overvoltage detecting function. The structure of the charge control IC 600 is the same as that shown in FIG. 3.

The discharge control FET 40 operates only as a discharge control switch. The charge control FET 30 operates as a charge control switch and also functions as follows.

The constant-current control circuit 610 controls the charge control FET 30 so that the potential difference across a current-detecting resistor R is kept at a predetermined value. The constant-voltage control circuit 620 detects a battery voltage Vcc(ba) of the secondary battery 70 and controls the charge control FET 30 so that the battery voltage Vcc(ba) does not exceed a predetermined voltage.

In response to a control signal generated from the constant-voltage control circuit 620, a current flowing through the charge control FET 30 is controlled. In order to perform a desired constant-current control, the characteristics of the charge control FET 30 have to be determined. For example, in the constant-current control, a voltage of the control signal generated from the constant-voltage control circuit 620 is set so that a drain current of the charge control FET 30 indicates a predetermined value. Constant-voltage control is similarly performed.

When the primary voltage Vcc(ad) is an overvoltage, the primary overvoltage detection circuit 630 detects a primary (adapter) voltage Vcc(ad), so that the charge control FET 30 is turned off. Thus, the charging operation is interrupted. In the charge interruption control, in a manner similar to the foregoing constant-current control and overcharge control, the characteristics of the transistor and the voltage of the control signal generated from the overvoltage detection circuit have to be set so that the transistor accurately performs the above-mentioned operation.

On the other hand, in the overcharge control, the characteristics of the charge control FET 30 have to be determined so that when a logical low level overcharge detection signal is supplied from the overcharge control circuit 220 to the gate of the charge control FET 30, the charge control FET 30 is turned off. In other words, in both of the constant-current control and the overcharge control, it is necessary to set the characteristics of the transistor and the voltage of the control signal so that the charge control FET 30 performs the above-mentioned operation with accuracy.

Figure 3:
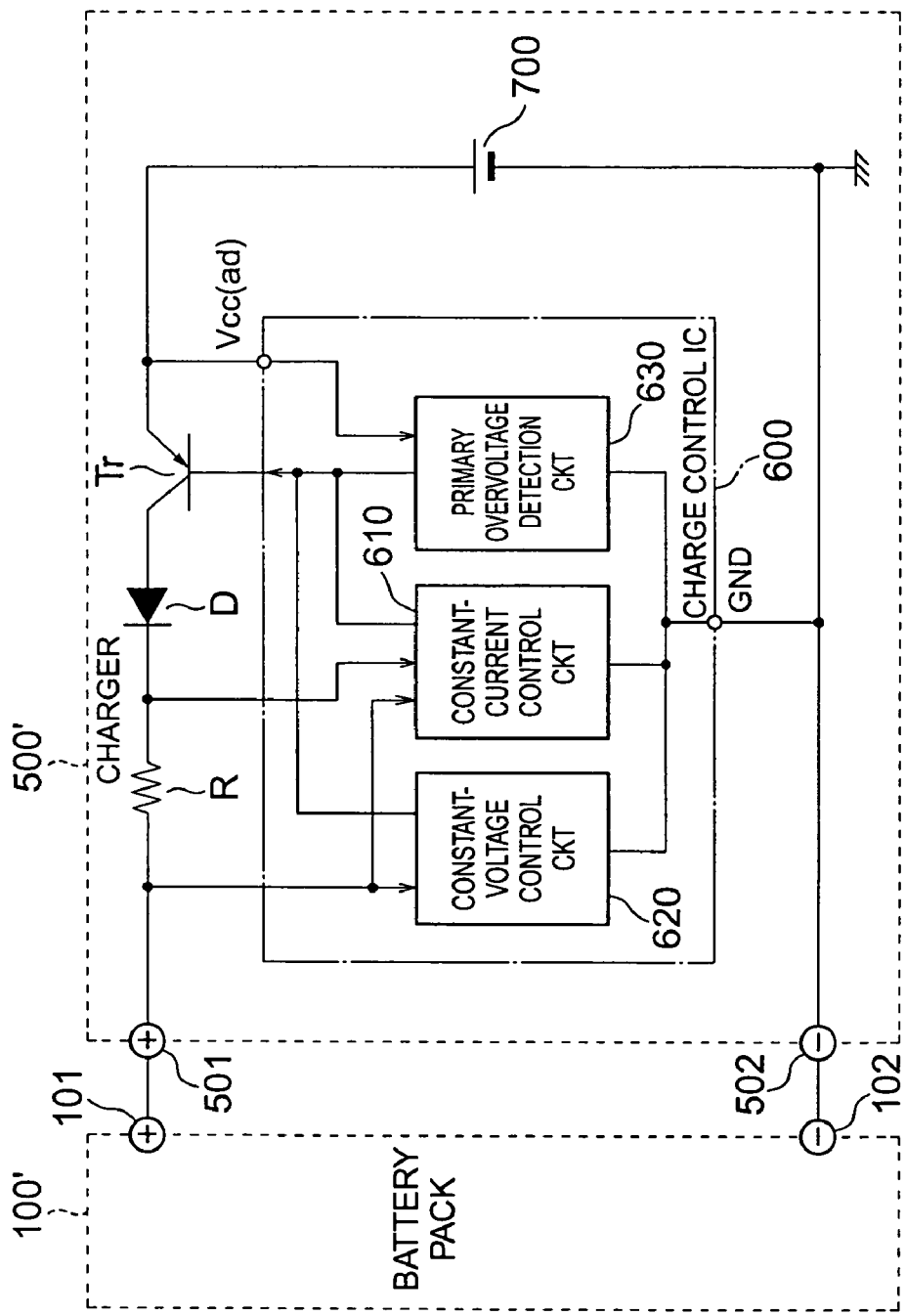
FIG. 3 is a block diagram showing the arrangement of a conventional charger and a charge control circuit (charge control IC) provided therefor.

The charge control FET 30 corresponds to the power transistor Tr included in the charger 500' in FIG. 3. In other words, the main features of the battery pack 100 with the charge control function according to the present invention are that the charge control FET 30 has a function of being controlled by the overcharge control circuit 220 and a function of being controlled by the charge control IC 600 to interrupt a current supplied to the charger 500. According to the present invention, in the above-mentioned arrangement, the one charge control FET 30 as a charge control device can perform both the charge control and the overcharge control.

When the charge control transistor (FET) and the discharge control transistor (FET) are built in the IC, for example, a multichip IC is used, a temperature detection level is improved, resulting in higher level of safety. According to this arrangement, a temperature is detected in the charge control and a temperature is also detected in the discharge control, so that charging and discharging can be controlled.

As obviously understood from the above description, according to the present invention, in the battery pack with the charge control function, the charge control FET has the function of controlling the overcharge control circuit and the function of performing the constant-current control and the constant-voltage control of the charge control IC. Consequently, both of the charge control and the overcharge control can be achieved by the one charge control FET serving as a charge control device. Moreover, the arrangement is simplified, resulting in the reduction of the manufacturing cost.

According to the present embodiment, the temperature detection unit (thermistor) having a temperature detecting function is built in the battery pack. Although an external thermistor is conventionally attached to the battery pack, the arrangement according to the present invention does not require the external thermistor.

According to the present invention, the device (transistor) generating heat is only one. In the related conventional arrangement, two external devices (transistors) generating heat adversely affect on the control. Thus, as compared to the conventional arrangement, the adverse effect caused by the heat can be reduced.

What is claimed is:

1. A battery pack with a charge control function, said battery pack comprising:
   an overdischarge control circuit for detecting an overdischarge mode of a secondary battery and supplying an overdischarge detection signal to a discharge control switch when the overdischarge mode is detected;
   an overcharge control circuit for detecting an overcharge mode of the secondary battery and supplying an overcharge detection signal to a charge control switch when the overcharge mode is detected; and
   a charge control circuit for performing charge control of the secondary battery by controlling the charge control switch;
   wherein the charge control circuit includes a constant-current control circuit, a constant-voltage control circuit, and a primary overvoltage detecting circuit;
   wherein the constant-current control circuit controls the charge control switch so as to keep a potential difference across a current-detecting resistor at a predetermined value in order to charge the battery pack at a constant current;
   wherein the constant-voltage control circuit detects a battery voltage of the secondary battery and controls the charge control switch so that the battery voltage does not exceed a predetermined voltage in order to charge the battery pack; and
   wherein the primary overvoltage detection circuit detects a primary voltage, and the primary over voltage detection circuit turns off the charge control switch and stops charging when the primary voltage is an overvoltage.

2. The battery pack according to claim 1, wherein:
   the discharge control switch includes a discharge control field-effect transistor having a gate serving as a control terminal, and
   the charge control switch includes a charge control field-effect transistor having a gate serving as a control terminal.

3. The battery pack according to claim 2, wherein:
   a gate voltage of the charge control field-effect transistor is controlled to adjust a drain current thereof so that the one charge control field-effect transistor performs both charge control and overcharge control.

4. The battery pack according to claim 1, further comprising a temperature detection unit.

5. The battery pack according to claim 4, wherein:
   the temperature detection unit detects a temperature in discharge control through the discharge control switch and detects a temperature in the charge control through the charge control switch.

6. The battery pack according to claim 5, wherein:
   the temperature detection unit includes a thermistor.

* * * * *